(12) United States Patent
Kuhnly et al.

(10) Patent No.: US 7,652,563 B2
(45) Date of Patent: Jan. 26, 2010

(54) OPTICAL INPUT DEVICE

(75) Inventors: Owen Kuhnly, Lindstrom, MN (US); Greg W. Parkhurst, Brooklyn Park, MN (US)

(73) Assignee: Kuryakyn Holdings, Inc., Somerset, WI (US)

( * ) Notice: Subject to any disclaimer, the term of this patent is extended or adjusted under 35 U.S.C. 154(b) by 321 days.

(21) Appl. No.: 11/900,813

(22) Filed: Sep. 13, 2007

(65) Prior Publication Data

US 2009/0072960 A1 Mar. 19, 2009

(51) Int. Cl.
*B60Q 1/00* (2006.01)
*G08B 21/00* (2006.01)

(52) U.S. Cl. .......... 340/450; 340/450.2; 340/450.3; 340/815.45; 340/618; 340/619

(58) Field of Classification Search .......... None
See application file for complete search history.

(56) References Cited

U.S. PATENT DOCUMENTS

| | | | |
|---|---|---|---|
| 5,103,648 A * | 4/1992 | Barbier | 62/126 |
| 6,889,064 B2 * | 5/2005 | Baratono et al. | 455/569.2 |
| 6,968,739 B1 * | 11/2005 | Baron et al. | 73/293 |
| 7,079,037 B2 | 7/2006 | Ross, Jr. et al. | 340/618 |
| 2006/0164230 A1 * | 7/2006 | DeWind et al. | 340/461 |
| 2007/0019426 A1 * | 1/2007 | Uken | 362/494 |

OTHER PUBLICATIONS

2003 Kuryakyn Catalog "Accessories for Harley-Davidson", p. 77 (2 pgs.).

* cited by examiner

*Primary Examiner*—Julie Lieu
(74) *Attorney, Agent, or Firm*—Dicke, Billig & Czaja, PLLC (57) ABSTRACT

One aspect is a device for displaying an indication of a system parameter. The device includes an input circuit, an optical sense circuit, a control circuit, and an output circuit. The input circuit is configured to receive input signals that are indicative of a measured system parameter. The optical sense circuit is configured to receive sense signals indicative of a sensed level of light and to receive programming signals related to a system parameter. The control circuit is configured to correlate the input and programming signals and to produce control signals dependant thereon. The output circuit is configured to display an indication of a system parameter that is based upon the control signals.

20 Claims, 5 Drawing Sheets

OPTICAL INPUT DEVICE

BACKGROUND

The present invention relates to the use of an optical input, such as an optical input used for the calibration of an indicator, such as a fuel gauge on a motorized vehicle. In some applications, certain indicators or gauges will give an indication of a system parameter, such as a level of fuel in a motorized vehicle. On occasion, adjustments or recalibration of the system, or of the gauges monitoring and displaying parameters of the system, may be desired. Adding input devices for the calibration, such as switches and the like, is not always practical.

For these and other reasons, there is a need for the present invention.

SUMMARY

One embodiment includes a device for displaying an indication of a system parameter. The device includes an input circuit, an optical sense circuit, a control circuit, and an output circuit. The input circuit is configured to receive input signals that are indicative of a measured system parameter. The optical sense circuit is configured to receive sense signals indicative of a sensed level of light and to receive programming signals related to a system parameter. The control circuit is configured to correlate the input and programming signals and to produce control signals dependant thereon. The output circuit is configured to display an indication of a system parameter that is based upon the control signals.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
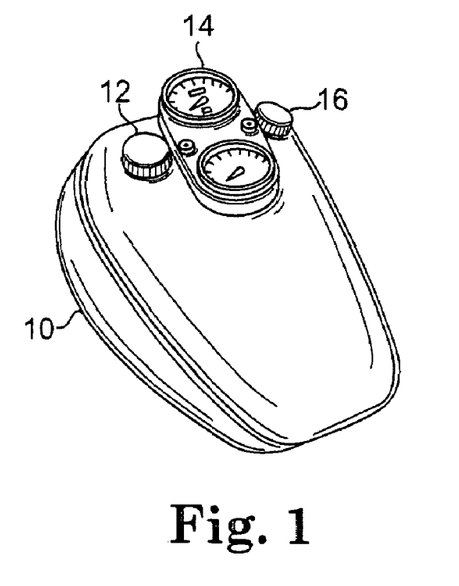
FIG. 1 illustrates a fuel tank with instruments and gauges.

FIG. 1 illustrates a motorized vehicle fuel tank 10 in accordance with one embodiment. In one embodiment, fuel tank 10 is configured on a motorcycle. In other embodiments, fuel tank 10 can be configured for other motorized vehicles. In one embodiment, fuel tank 10 includes fuel and battery level indicator 12, instrumentation 14 and fill cap 16.

In operation, fill cap 16 is removed and fuel is pumped into fuel tank 10. Fuel and battery level indicator 12 then provides an indication of the level of fuel within tank 10. Indicator 12 can also provide an indication of the battery level of a battery on the vehicle on which fuel tank 10 is mounted. Instrumentation 14 can provide other indicators of the motor vehicle parameters, such as vehicle speed and engine RPM.

In some instances, the actual level or value of system parameter and the measured level or value of that parameter are not well coordinated. In a system where an indicator displays an indication of the measured value, the displayed value and the actual value will not be correlated. For example, in some cases the actual level of fuel in fuel tank 10 can differ from the measured level, and thus different from the level displayed on indicator 12. In one example, variations in different float mechanisms or sensor mechanisms that may be used to sense the level of fuel in tank 10, and/or variations in the different transmission units that may be used to transmit the sensed level to indicator 12, can cause different or varying relative levels to be displayed on indicator 12. As such, indicator 12 may indicate a "full" tank when in fact tank 10 is only three-quarters full.

Figure 2:
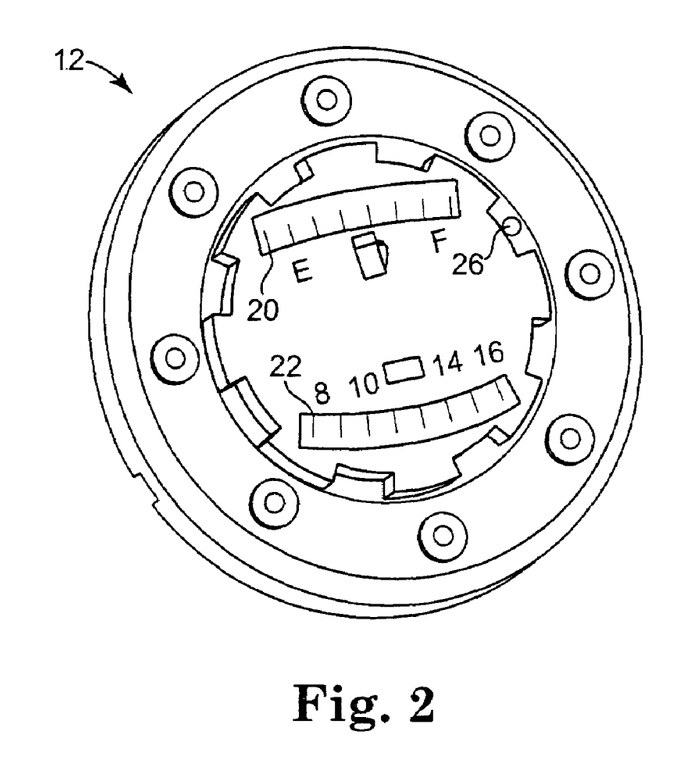
FIG. 2 illustrates a fuel and battery gauge in accordance with one embodiment.

FIG. 2 illustrates fuel and battery level indicator 12 in accordance with one embodiment. Indicator 12 includes fuel display 20, battery display 22, optical sensor 26 and control circuit 30 (not visible in FIG. 2). In one embodiment, indicator 12 is a unitary piece that is insertable into tank 10 for mounting therein. Indicator 12 can include a tube or rod that extends down into tank 10 with a level sensor that measures the actual level of fuel in tank 10. Further, indicator 12 can be configured with an input for receiving an indication of the level of a battery associated with the vehicle to which tank 10 is attached. In one example, indicator 12 can replace an existing indicator.

In one embodiment, both fuel display 20 and battery display 22 each include a series of LEDs that are controllably enabled by control circuit 30. As such, a number of LEDs will be turned on in accordance with a level detected and transmitted to indicator 12. For example, if indicator 12 has an indication that tank 10 is full of fuel, all of the LEDs in fuel display 20 can be lit.

Optical sensor 26 is configured to sense the amount of light present at indicator 12. If the amount of light sensed by sensor 26 is relatively great, this typically indicates a daylight mode. In such a mode, control circuit 30 will adjust the brightness of the LEDs in both fuel display 20 and battery display 22 so that they are at their brightest in order to ensure their visibility. When the amount of light sensed by sensor 26 is relatively slight, this typically indicates a night mode. In such a mode, control circuit 30 will adjust the brightness of the LEDs in both fuel display 20 and battery display 22 so that they are less bright, as that is all that will be needed to ensure visibility.

Figure 3:
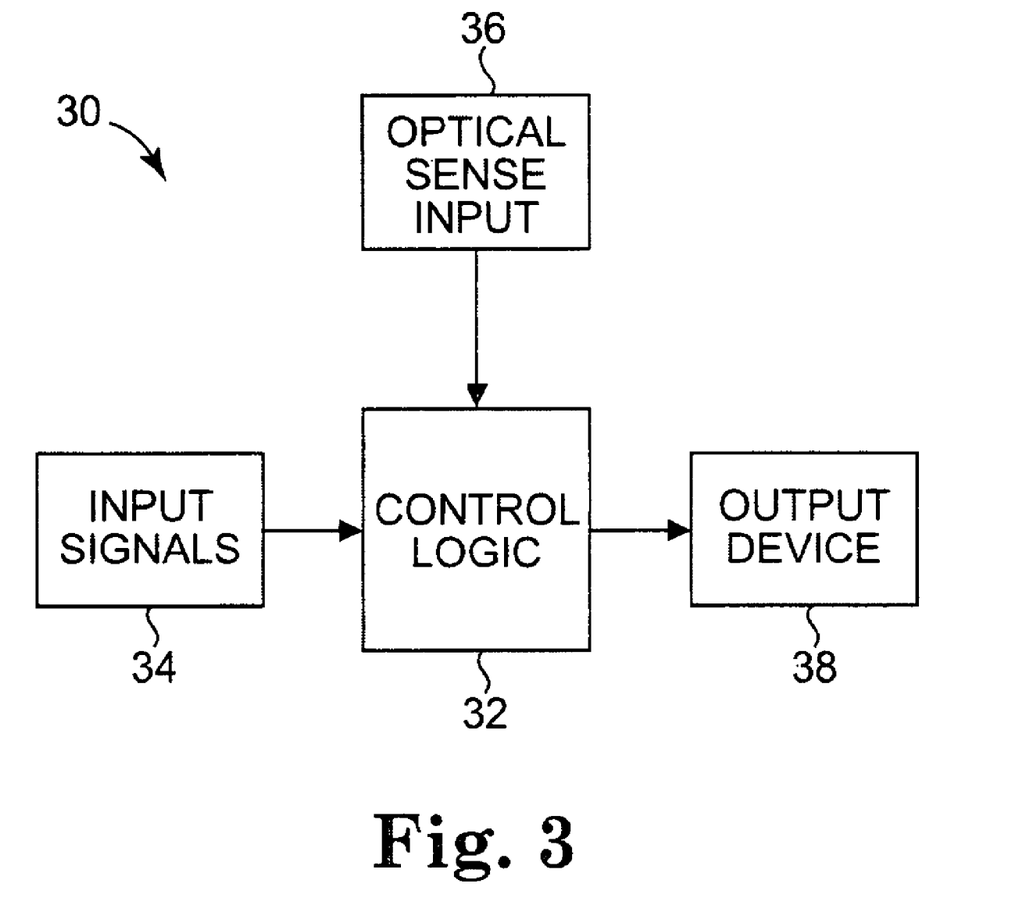
FIG. 3 illustrates a control circuit for a gauge in accordance with one embodiment.

FIG. 3 illustrates basic control circuit 30 in accordance with one embodiment. Control circuitry 30 includes control logic 32, input circuit 34, optical sense circuit 36, and output circuit 38. In one embodiment, control circuit 30 is fully integrated into indicator 12.

In operation, input circuit 34 is configured to generate and/or receive input signals, such as the level of fuel in tank 10, or the level of a battery. Input circuit 34 is configured to transmit these input signals to control logic 32. Optical sense circuit 36 is configured to generate and/or receive sense signals that are indicative of a light level at a particular location, such as at the face of indicator 12 where optical sensor 26 is located. Optical sense circuit 36 is configured to transmit these sense signals to control logic 32. Output circuit 38 is configured to control fuel display 20 and battery display 22, enabling, disabling and adjusting the intensity of associated LEDs in accordance with control signals from control logic 32, which is coupled thereto. The control signals from control logic 32 for controlling the LEDs are based in the input signals from input circuit 34 and the sense signals from optical sense circuit 36.

In one example, input signals from input circuit 34 include an indication of a measured level of fuel in tank 10. These input signals are transmitted to control logic 32. Control logic 32 then generates control signal based on the input signals and transmits these control signals to output circuit 38. These control signals then control how many LEDs are lighted in fuel display 20, which will be in proportion to the measured level of fuel in tank 10. Control signals can also include an indication of the level of light proximate to fuel display 20 from the sense signals that are transmitted from optical sense circuit 36. As such, the level of intensity of the LEDs of fuel display can be adjusted based upon this measured level of light.

Furthermore, sense signals from optical sense circuit 36 can further include programming signals. For example, when variations in sensing and transmission mechanisms of indicator 12 cause inaccuracy in the relative levels between the actual level and those that are measured and displayed, an operator may wish to recalibrate indicator 12. Recalibration can ensure, for example, that when fuel tank 10 is in fact empty, the fuel display 20 also displays empty, and when fuel tank 10 is in fact full, the fuel display 20 also displays full. This recalibration can be accomplished by generating programming signals in optical sense circuit 36, which are then used to generate control signals in control logic 32.

In one example, optical sensor 26 can be manipulated in order to generate these programming signals in optical sense circuit 36. In one embodiment, a user can signal that fuel tank 10 is in fact empty, or "an empty condition", by blocking and unblocking optical sensor 26 in a certain specified sequence for a certain specified period of time. This programming signal indicative of an actual empty condition is sent to control logic 32. Control logic 32 also receives input signals from input circuit 34 that are indicative of the measured level of fuel in fuel tank 10. Control logic 32 can then assign this measured level as the empty condition and recalibrate accordingly.

Additional programming signals can be similarly generated in order to indicate other conditions, such as "full condition" when tank 10 is full, a "half condition" when tank 10 is half full, and so on. Only one indication of the actual condition input through optical sensor 26 as a programming signal is needed for recalibration with the measured signals, and then the remaining correlation between actual and measured conditions can be extrapolated, or a plurality of such condition indications can also be used.

Figure 4:
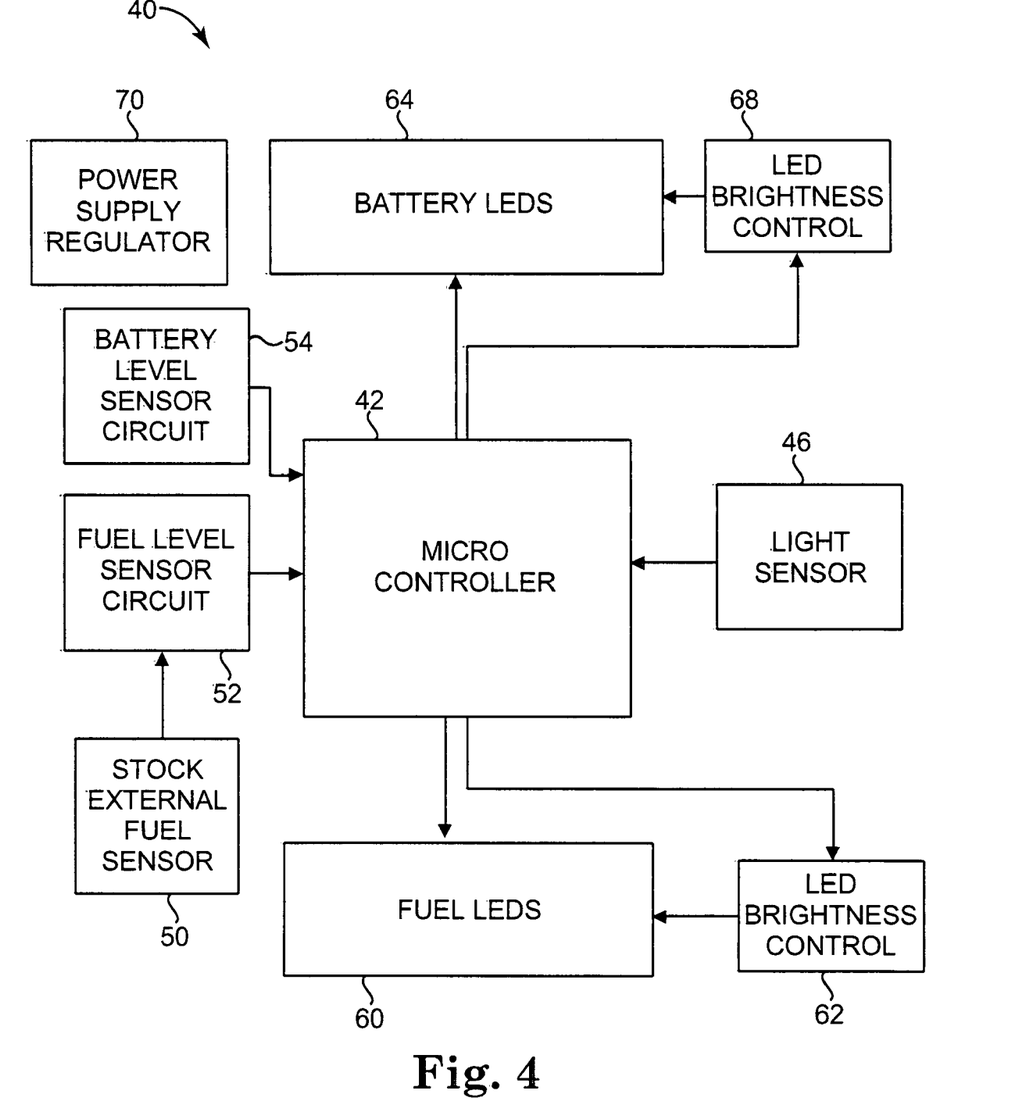
FIG. 4 illustrates further detail of a control circuit in accordance with one embodiment.

FIG. 4 illustrates additional detail of control circuit 40 in accordance with one embodiment. Control circuit 40 includes microcontroller 42, optical sensor circuit 46, fuel sensor 50, fuel level sensor circuit 52, battery level sensor circuit 54, fuel LEDs 60, fuel LED control circuit 62, battery LEDs 64, battery LED control circuit 68, and power supply regulator 70. In one embodiment, power supply regulator 70 is provided to provide regulated power to the various components of control circuit 40.

In operation, fuel sensor 50 is configured to measure the actual level of fuel in a tank, such as tank 10. Sensor 50 can be any of a variety of mechanisms configured to measure the actual level of fuel in a tank, such as a float sensor. The measured level of fuel is then sent to fuel level sensor circuit 52 as an input signal. Similar input signals, but reflective of a measured battery level rather than measured fuel level, can be sent to battery level sensor circuit 54. Input signals from fuel level sensor circuit 52 and battery level sensor circuit 54 are then transmitted to microcontroller 42.

Optical sensor circuit 46 is configured to measure and/or receive sense signals that are indicative of a light level at a particular location, such as at the face of indicator 12. In one case, a sensor, such as optical sensor 26, is used to measure a light level and transmit the measured level as a sense signal to optical sensor circuit 46. Optical sense circuit 46 is configured to transmit these sense signals to microcontroller 42.

Optical sensor circuit 46 is further configured to receive programming signals that are indicative of an actual system parameter. For example, when variations in sensing and transmission mechanisms of a system cause inaccuracy in the relative levels between the actual level and those that are measured and displayed, programming signals can be used to recalibrate these levels to establish a better correlation between actual and measured levels. These programming signals are then transmitted to microcontroller 42.

In one embodiment, microcontroller 42 receives input signals from fuel level sensor circuit 52 and battery level sensor circuit 54, receives sense and programming signals from optical sensor circuit 46, and uses these signals to generate control signals that are asserted on fuel LEDs 60, fuel LED control circuit 62, battery LEDs 64, and battery LED control circuit 68. As such, microcontroller 42 controls how many LEDs are on and off, as well as the overall intensity of the LEDs that are on.

In one example, fuel and battery LEDs 62 and 64 each include 10 LEDs that can be turned on and off. As such, when input signals indicate that fuel level is in a full condition, all 10 LEDs will be turned on, when input signals indicate that fuel level is in a half condition, 5 of the 10 LEDs will be turned on, and the other 5 will remain off, and so on.

In one example, control circuit 40 is provided in an indicator, such as indicator 12 above. As such, optical sensor 26 can be used to generate programming signals so that microcontroller 42 can generate a good correlation between actual and measured levels, upon prompting by a user.

In one example, programming signals are generated in optical sensor circuit 46 by having a user block and unblock optical sensor 26 in a specified sequence for a certain specified period of time. In one example, a user can program an indication that fuel tank 10 is empty. As such, microcontroller 42 can correlate the measured fuel level from fuel sensor 50 with an empty condition when it receives this programmed indication from a user.

A user initiates the programming process by covering optical sensor 26 for three seconds, and then releasing it. This process of covering for three seconds can be referred to as the "programming initiating step." In response to this programming initiating step, microcontroller 42 then lights only a single LED near the center of the 10 LEDs in fuel LEDs 62. In response to the single LED coming on, the user then again covers optical sensor 26. Next, in response to optical sensor 26 being covered again, microcontroller 42 turns off the single LED so that all 10 LEDs in fuel LEDs 62 are off. When the user sees that all of the LEDs are off, the user again covers optical sensor 26. In response to this blocking, microcontroller 42 then again lights only a single LED near the center of the 10 LEDs in fuel LEDs 62.

This responsive process of covering and releasing optical sensor 26 in response to microcontroller 42 turning on and off a LED, or the "programming responsive steps," can be repeated several times in order to ensure that it is a true programming sequence and not a random occurrence.

For example, where control circuit 40 is provided in indicator 12, which is mounted in the fuel tank of a motorcycle, it is possible that the motorcycle could randomly pass through tunnel or other obstacle to light that suddenly darkens optical sensor 26 for three seconds, much like would occur when a user covers sensor 26, thereby initiating the programming sequence.

If the random occurrence is perceived as the programming initiating step, microcontroller 42 will light a single LED near the center fuel LEDs 62 in response to this blocking. If the user does not follow this with the programming responsive steps, however, then microcontroller 42 will not continue with the programming sequence and will not correlate the measured fuel level from fuel sensor 50 with an empty condition. As such, only a true programming sequence, with a programming initiating step followed by programming responsive steps, will correlate measured input signal with actual, and random occurrence will not do so.

Figure 5A:
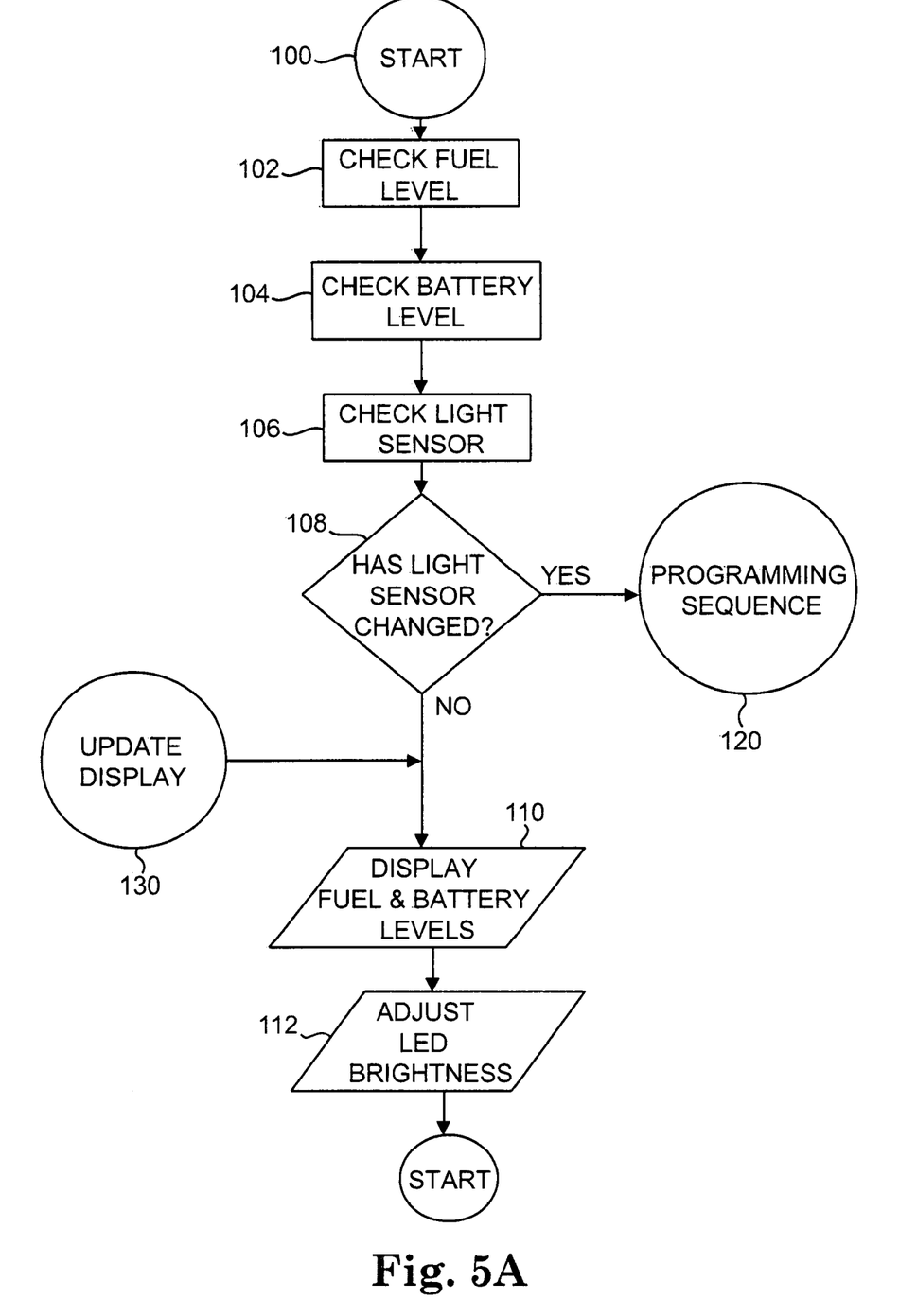
FIGS. 5A-5B illustrates a sequence for adjusting a control circuit in accordance with one embodiment.
Figure 5B:
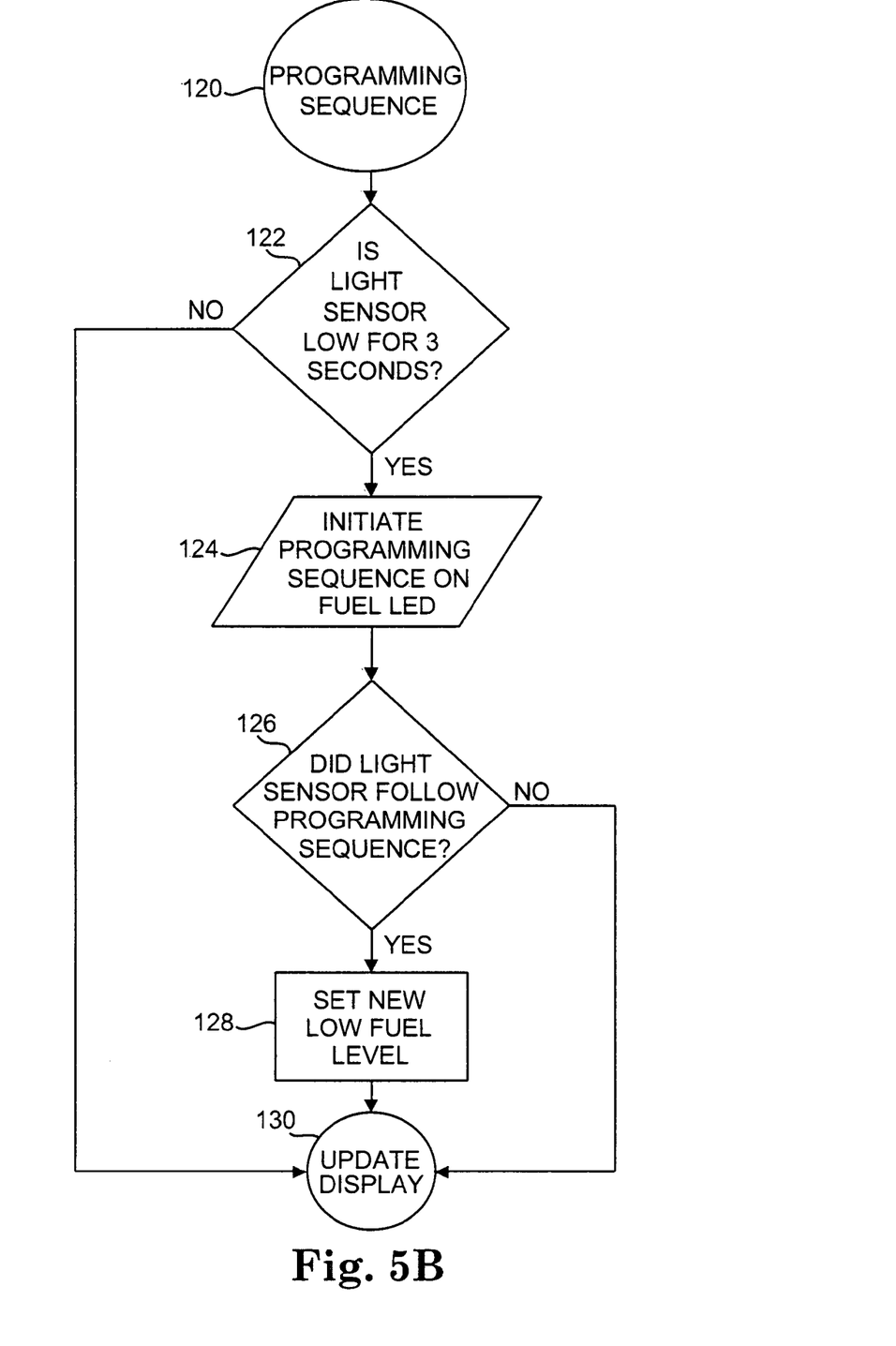

FIGS. 5A-5B are block diagrams illustrating one exemplary process that can be used to program a control circuit such as control circuit 30 of FIG. 3 or control circuit 40 of FIG. 4. Other variations on the process will also achieve programming a control circuit to recalibrate system parameters to correlate a measured parameter with an actual parameter.

At step 100, the process is started. At step 102, the fuel level is checked. In one example, fuel level sensor circuit 52 checks fuel sensor 50 to determine the measured level of fuel. At step 104, battery level is checked. In one example, battery level sensor circuit 54 checks a battery to determine the measured level of battery voltage. At step, 106 a light sensor is checked to determine the present level of ambient light. For example, optical sensor 26 could be monitored to determine the level of ambient light at the sensor.

Next, at step 108, a determination is made as to whether the level of light at the light sensor has changed from the last time that the sensor was checked. If the light level has not changed, then at step 110 fuel and battery levels are displayed on the LEDs in accordance with the levels measured at steps 102 and 104. At step 112, the intensity level of the LEDs is adjusted in accordance with the light level measured at the sensor at step 106. The program sequence then cycles back to the start step 100.

If a determination is made at step 108 that the level of light at the light sensor has changed from the last time that the sensor was checked, then at step 120 a programming sequence is initiated. Once the programming sequence is initiated, a determination is made as to whether the light level at the sensor was low for three seconds at step 122 (in FIG. 5B). If the light level was not low for at least three seconds, then the display is updated in accordance with the currently sensed light level at step 130, and the process returns to step 110 on FIG. 5A.

If a determination is made at step 122 that the light level was low for at least three seconds, then the programming sequence on the fuel LED, or "programming initiating step," is initiated at step 124. Next, at step 126 a determination is made as to whether the light sensor followed the programming sequence, or "programming responsive steps." If the light sensor did not follow the programming responsive steps, then the determination is made at step 126 that this was a random occurrence and not a programming sequence and the display is updated at step 130.

If the light sensor did follow the programming responsive steps, however, then the determination is made at step 126 that this was a programming sequence. As such, a new low fuel level is set at step 128. In one example, this is accomplished by correlating the current measured level of fuel with the empty condition for the fuel tank.

One skilled in the art understands that variations to the process illustrated in FIGS. 5A-5B are possible in accordance with alternative embodiments. For example, although the determination is made as to whether the light level at the sensor was low for three seconds at step 122, other timing parameters can also be used the programming initiating step. A shorter or a longer time for covering the optical sensor can be used.

Similarly, variations in the conditions that verify programming responsive steps can also be used. For example, rather than turning a single LED on and off and having a user responsively cover the optical sensor over a series of three cycles, more or less cycles can be used. Furthermore, additional LEDs could be used in the process. For example, when a single LED is lighted, the user may need to cover the optical sensor for one second, when two LEDs are lighted, the user needs to cover the optical sensor for two seconds, when three LEDs are lighted, the user needs to cover the optical sensor for three seconds, and so on.

Any similar non-random sequences can be used to verify programming responsive steps that are differentiated from a random occurrence, which can be caused when the optical sensor is simply randomly blocked from a light source for short periods of time. For example, when the light source is integrated in a motorized vehicle such as a motorcycle, the light source may effectively blocked for a short period time by a random occurrence like passing through a tunnel. This can trigger the programming initiating step. Such a random occurrence is not likely, however, to follow the specific pattern of turning on and off the LEDs that follows, and thus, will not verify the programming responsive steps.

Although one embodiment illustrates optical sensor used as a programming switch for correlating or recalibrating fuel level in a tank, one skilled in the art will understand that this input can also be used to trigger other programmable events. For example, microcontroller 42 of control circuit 40 is configured to receive inputs from fuel level sensor circuit 52 and battery level sensor circuit 54. Although the recalibration or correlation described above is used with respect to the fuel level input from fuel level sensor circuit 52, similar use could be made of a battery level input from battery level sensor circuit 54.

Furthermore, other input signals from other system parameters could be routed to microcontroller 42, and an optical sensor coupled to optical sensor circuit 46 can be used to trigger programming use of these input signals. Microcontroller 42 can differentiate which input signal is to be used, as well as what use is to made of the input signal, by the different programming signals that are sent from optical sensor 46.

For example, blocking optical sensor for three seconds may initiate the fuel calibration process described above, while blocking optical sensor for six seconds may initiate a different process relating to a system parameter, such as calibrating the battery, calibrating a speedometer, calibrating a tachometer, turning off a gauge, turning on a gauge, and so on. In each case, after the programming initiating step is verified, it is followed by a programming responsive step, similar to that described above, to verify that this was a programming sequence rather than a random occurrence.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device for displaying an indication of a system parameter, the device comprising:
    an input circuit configured to receive input signals indicative of a measured system parameter;
    an optical sense circuit configured to receive sense signals indicative of a sensed level of light and to receive programming signals related to a system parameter;
    a control circuit configured to correlate the input and programming signals and to produce control signals dependant thereon; and
    an output circuit configured to display an indication of a system parameter that is based upon the control signals.

2. The device of claim 1, wherein the programming signals include an indication of a programming initiating step and an indication of programming responsive steps.

3. The device of claim 2, wherein the control circuit verifies a programming sequence when receiving an indication of both the programming initiating step and an indication of the programming responsive steps in the programming signals such that an actual system parameter is correlated to a measured system parameter.

4. The device of claim 2, wherein the control circuit verifies a random occurrence when receiving an indication of the programming initiating step but no indication of the programming responsive steps in the programming signals.

5. The device of claim 3, wherein the device is configured in a fuel tank of a motorcycle.

6. The device of claim 5, wherein the optical sense circuit comprises an optical sensor configured to measure ambient light proximate to the fuel tank of the motorcycle.

7. The device of claim 6, wherein the output circuit comprises a first set of LEDs configured to display an indication of a level of fuel in the fuel tank and a second set of LEDs to display an indication of a level of a battery.

8. The device of claim 7, wherein the programming initiating step includes blocking the optical sensor for a specified time period.

9. The device of claim 8, wherein the programming responsive steps include alternately blocking and unblocking the optical sensor for specified time periods and in response to the turning on and turning off of one or more LEDs in the first and second sets of LEDs.

10. The device of claim 9, wherein correlating an actual system parameter to a measured system parameter includes correlating an empty state of the fuel tank to a measured fuel level in the fuel tank.

11. A device for displaying an indication of a system parameter or a motorized vehicle, the device comprising:
    an input circuit configured to receive input signals indicative of a measured system parameter for the motorized vehicle;
    an optical sense circuit configured to receive sense signals indicative of a sensed level of light proximate to a location on the motorized vehicle mid am figured to receive a programming initiating step and programming responsive steps;
    a control circuit configured to correlate the input signals, the programming initiating step and the programming responsive steps in order to produce control signals dependant thereon; and
    an output circuit configured to display an indication of a system parameter of the motorized vehicle that is based upon the control signals.

12. The device of claim 11, wherein the control circuit correlates an actual system parameter to a measured system parameter when it receives an indication of both the programming initiating step and an indication of the programming responsive steps.

13. The device of claim 12, wherein the device is configured in a fuel tank of a motorcycle and wherein correlating the actual system parameter to the measured system parameter includes correlating an actual fuel level of the fuel tank with a measured level fuel in the fuel tank.

14. The device of claim 11, wherein the programming initiating step includes blocking an optical sensor in the optical sensor circuit for a specified time period and wherein the programming responsive steps include alternately blocking and unblocking the optical sensor for specified time periods and in response to a signal on the device that is turning on and turning off.

15. A method for adjusting a device configured to display an indication of a system parameter, the method comprising:
    measuring a system parameter;
    sensing the level of light at an optical sensor over a period of time;
    determining whether a programming initiating step has been indicated by the level of light sensed at the optical sensor over the period of time;
    determining whether programming responsive steps have been by the level of light sensed at the optical sensor over the period of time; and
    adjusting the display of the indication of the system parameter when both the programming initiating step and the programming responsive steps have been indicated.

16. The method of claim 15, wherein determining whether the programming initiating step has been indicated includes determining whether the optical sensor has been blocked for longer than a specific period of time.

17. The method of claim 16, wherein determining whether the programming responsive step has been indicated includes determining whether the optical sensor has been blocked and unblocked in a correlated fashion to the turning on and turning off of an indicator light.

18. The method of claim 17, wherein the measuring a system parameter includes measuring the level of fuel in a fuel tank or a motorcycle.

19. The method of claim 18, wherein adjusting the display includes correlating an actual system parameter with a measured system parameter and responsively displaying the correlated system parameter.

20. The method of claim 19, wherein adjusting the display includes correlating an actual fuel level of the fuel tank with the measured level fuel in the fuel tank and displaying an indication of the correlated level.

\* \* \* \* \*

UNITED STATES PATENT AND TRADEMARK OFFICE
CERTIFICATE OF CORRECTION

PATENT NO. : 7,652,563 B2 Page 1 of 1
APPLICATION NO. : 11/900813
DATED : January 26, 2010
INVENTOR(S) : Owen Kuhnly and Greg W. Parkhurst It is certified that error appears in the above-identified patent and that said Letters Patent is hereby corrected as shown below:

Column 8, line 12, delete "mid am" and insert in place thereof --and--.

Signed and Sealed this

Eighteenth Day of May, 2010

David J. Kappos
*Director of the United States Patent and Trademark Office*